US009970496B2

(12) United States Patent
Glidewell (10) Patent No.: US 9,970,496 B2
(45) Date of Patent: May 15, 2018

(54) CATHODICALLY PROTECTED HUB AND BRAKE ROTOR ASSEMBLY

(71) Applicant: KODIAK PRODUCTS CO., INC., Fort Worth, TX (US)

(72) Inventor: William E. Glidewell, Lewisville, TX (US)

(73) Assignee: Kodiak Products Co., Inc., Fort Worth, TX (US)

( * ) Notice: Subject to any disclaimer, the term of this patent is extended or adjusted under 35 U.S.C. 154(b) by 0 days. days.

(21) Appl. No.: 14/822,381

(22) Filed: Aug. 10, 2015

(65) Prior Publication Data

US 2016/0047430 A1 Feb. 18, 2016

Related U.S. Application Data

(60) Provisional application No. 62/036,347, filed on Aug. 12, 2014.

(51) Int. Cl.
| | |
|---|---|
| *F16D 65/12* | (2006.01) |
| *C23F 13/14* | (2006.01) |
| *C23F 13/02* | (2006.01) |
| *F16D 65/00* | (2006.01) |
| *C23F 13/10* | (2006.01) |
| *F16D 65/02* | (2006.01) |

(52) U.S. Cl.
CPC .............. *F16D 65/12* (2013.01); *C23F 13/02* (2013.01); *C23F 13/10* (2013.01); *C23F 13/14* (2013.01); *F16D 65/0025* (2013.01); *F16D 2065/13* (2013.01); *F16D 2065/1384* (2013.01)

(58) Field of Classification Search
CPC ................. F16D 65/0025; F16D 65/12; F16D 65/126–65/127; F16D 2065/13; F16D 2065/1384; F16D 65/02; F16D 65/0037; F16D 65/004; C23F 13/02; C23F 13/14
USPC .............................. 188/218 XL, 215 R, 18 A
See application file for complete search history.

(56) References Cited

U.S. PATENT DOCUMENTS

| | | | | |
|---|---|---|---|---|
| 6,135,247 | A | * | 10/2000 | Bodin ...................... F16D 65/12 188/18 A |
| 6,298,957 | B1 | * | 10/2001 | Haug .................... C04B 41/009 188/251 M |
| 7,086,705 | B2 | | 8/2006 | Rau, III et al. |
| 7,138,184 | B2 | | 11/2006 | Clerici et al. |
| 8,256,968 | B2 | | 9/2012 | Kapaan et al. |
| 8,534,924 | B2 | | 9/2013 | Zwarts et al. |
| 2005/0078897 | A1 | | 4/2005 | Zhang |
| 2006/0272909 | A1 | | 12/2006 | Fuller et al. |

(Continued)

FOREIGN PATENT DOCUMENTS

| | | | |
|---|---|---|---|
| DE | 2933488 A | * | 4/1981 |
| KR | 2005026238 | * | 3/2005 |

(Continued)

OTHER PUBLICATIONS

English machined translation of KR-2011034850.*
Machined translation of DE-2933488.*

*Primary Examiner* — Robert A. Siconolfi
*Assistant Examiner* — San Aung
(74) *Attorney, Agent, or Firm* — Sand & Sebolt (57) ABSTRACT

A wheel hub and brake rotor assembly is disclosed which is resistant to corrosion via cathodic protection. One or more sacrificial anodes may be mounted on the hub and/or the rotor.

20 Claims, 5 Drawing Sheets

(56) References Cited

U.S. PATENT DOCUMENTS

| | | | | |
|---|---|---|---|---|
| 2007/0181390 A1* | 8/2007 | Korm | ............... | F16D 65/128 |
| | | | | 188/218 XL |
| 2008/0099288 A1* | 5/2008 | Burgoon | ............ | B60T 8/329 |
| | | | | 188/218 XL |
| 2009/0035598 A1* | 2/2009 | Hanna | ............... | B22D 19/00 |
| | | | | 428/550 |
| 2009/0101456 A1* | 4/2009 | Layton | ............ | F16D 65/0006 |
| | | | | 188/18 A |
| 2011/0192955 A1* | 8/2011 | Hanna | ............ | F16D 65/0006 |
| | | | | 248/636 |
| 2015/0285322 A1* | 10/2015 | Wallmeier | ........ | F16D 65/128 |
| | | | | 188/218 XL |

FOREIGN PATENT DOCUMENTS

| | | | |
|---|---|---|---|
| KR | 2011034850 | * | 4/2011 |
| WO | 2008/145313 | | 12/2008 |

* cited by examiner

CATHODICALLY PROTECTED HUB AND BRAKE ROTOR ASSEMBLY

CROSS-REFERENCE TO RELATED APPLICATION

This application claims priority from U.S. Provisional Application Ser. No. 62/036,347, filed Aug. 12, 2014, the disclosure of which is incorporated herein by reference.

BACKGROUND OF THE INVENTION

Technical Field

The present invention relates generally to a hub and brake rotor assembly such as used for a wheel assembly of a wheeled vehicle. More particularly, the invention relates to corrosion resistance of such an assembly by use of cathodic protection.

Background Information

Corrosion of hub and brake rotor assemblies is well known, and is especially problematic in coastal areas due to the salt water. Coatings of various sorts have been applied to hubs and rotors in an attempt to prevent or minimize such corrosion. While such coatings have been used with various degrees of success, there is still a need in the art for better protection. The present invention addresses this and other problems in the art.

SUMMARY

In one aspect, the invention may provide an apparatus comprising: at least one of a wheel hub and a brake rotor; and a first sacrificial anode secured to the at least one of the wheel hub and brake rotor.

In another aspect, the invention may provide a method comprising the steps of: providing an assembly comprising at least one of a wheel hub and a brake rotor; and securing a sacrificial anode to the at least one of the wheel hub and brake rotor.

BRIEF DESCRIPTION OF THE SEVERAL VIEWS OF THE DRAWINGS

A sample embodiment of the invention is set forth in the following description, is shown in the drawings and is particularly and distinctly pointed out and set forth in the appended claims.

Similar numbers refer to similar parts throughout the drawings.

DETAILED DESCRIPTION

Figure 1:
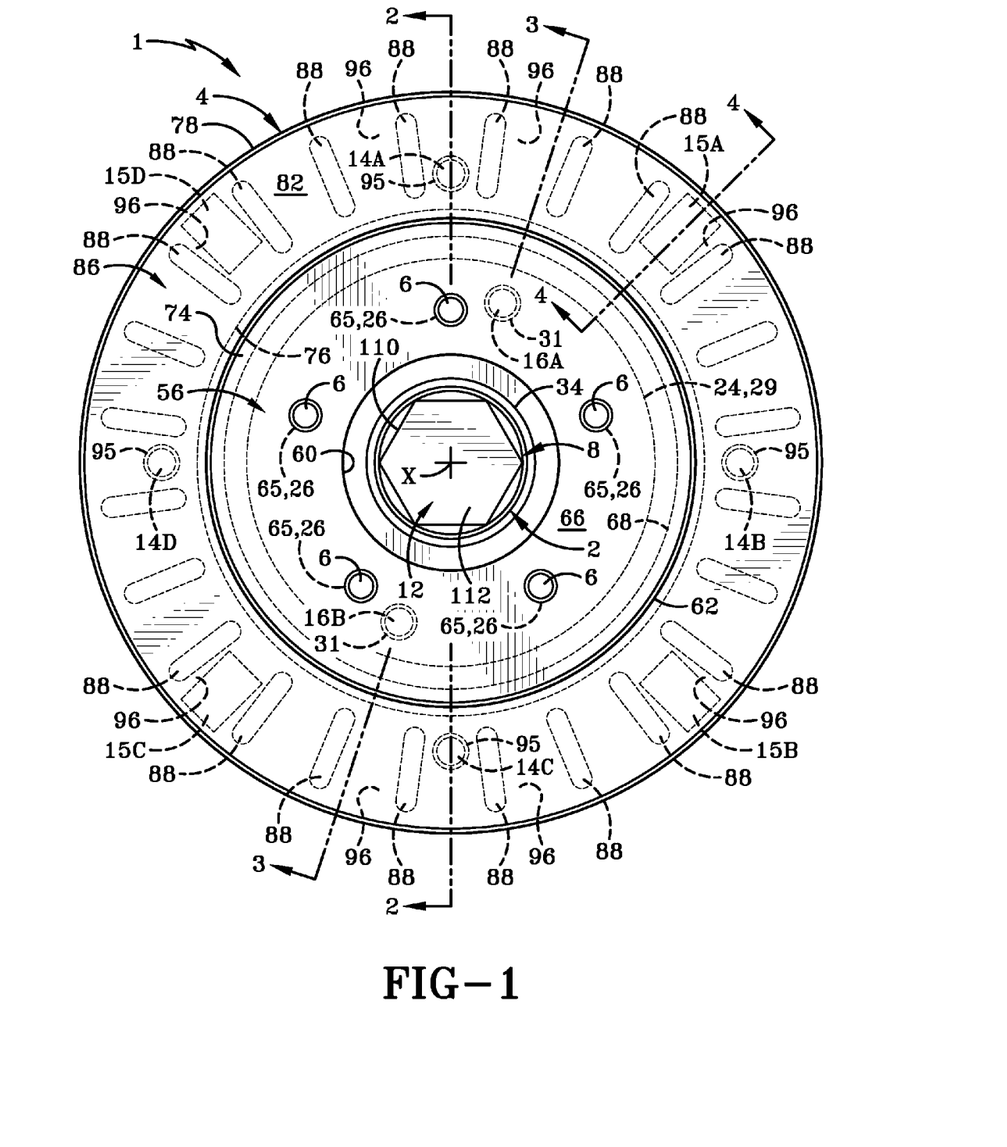
FIG. 1 is an outboard end elevation view of the hub and brake rotor assembly.
Figure 2:
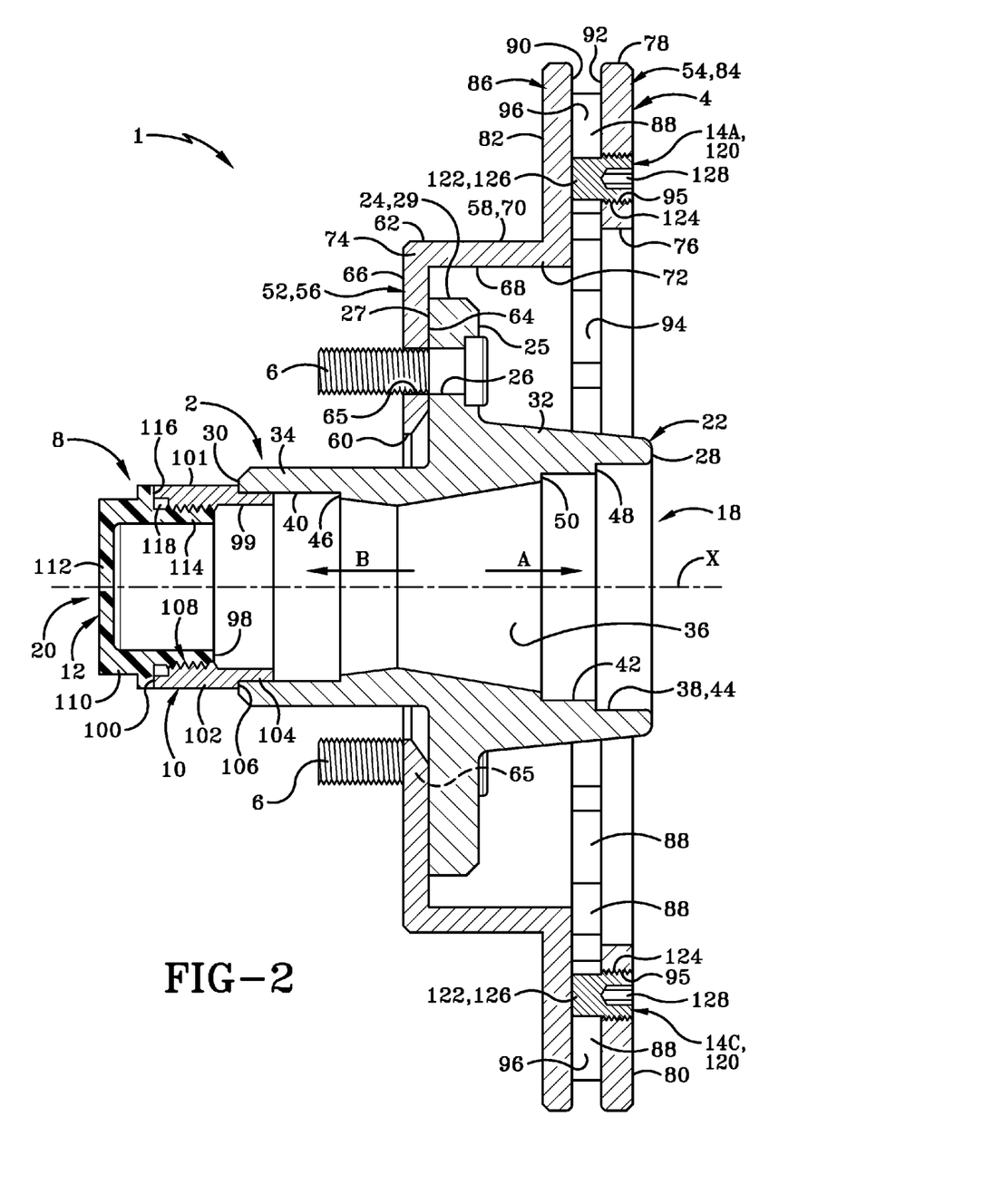
FIG. 2 is a sectional view taken on line 2-2 of FIG. 1.
Figure 3:
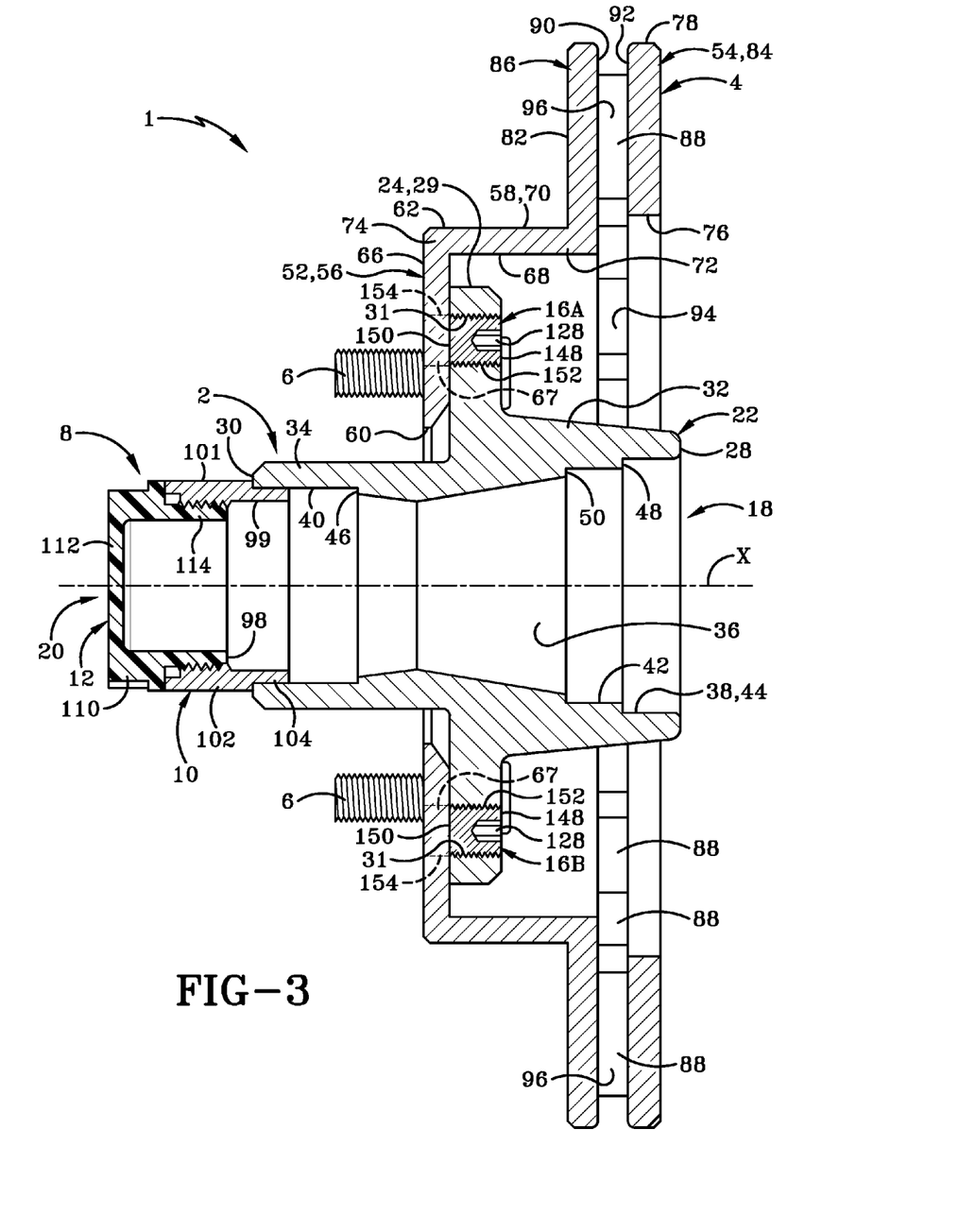
FIG. 3 is a sectional view taken on line 3-3 of FIG. 1.

FIGS. 1-3 show a hub and brake rotor assembly 1 which may include a hub 2, a brake rotor 4, a plurality of wheel bolts or studs 6, a bearing protector assembly 8 having a bearing protector or sleeve 10 and dust cap 12, a plurality of galvanic or sacrificial anodes 14A-D, 15A-D and 16A-B. Sleeve 10 may also serve as a galvanic or sacrificial anode. Hub 2 and brake rotor 4 are formed of metal, typically cast iron or ductile iron, and less commonly a steel which may be a stainless steel. The figures show hub 2 and rotor 4 as individual pieces which are secured to one another by bolts 6. However, the figures also may represent that hub 2 and rotor 4 are formed as an integral hub and rotor which is a single unitary piece. Wheel bolts 6 are formed of a suitable metal such as steel, as known in the art. Sleeve 10 when serving as a sacrificial anode, and sacrificial anodes 14, 15 and 16 are formed of a suitable metal which will serve as a sacrificial anode for hub 2 and/or rotor 4. These anodes are typically formed of aluminum or an aluminum base alloy, zinc or a zinc base alloy, or magnesium or a magnesium base alloy. One example of a suitable aluminum alloy for use as a sacrificial anode is military specification MIL-A-24779, which is roughly about 95% aluminum and about 5% zinc plus or minus about 1% or 2% of either element. This is but one example, and many other alloys may be suitable for the present purpose.

Assembly 1 has an inboard end 18 and an outboard end 20 and has a central axis X which extends from inboard end 18 to outboard end 20 and about which assembly 1 is rotatable such as it is when a wheel assembly (tire and rim) is mounted thereon and assembly 1 is mounted on a spindle assembly of a wheeled vehicle. Assembly 1 is essentially symmetrical about axis X. Assembly 1 has an axial direction extending generally in the direction of axis X. Assembly 1 has an inboard direction (Arrow A) which is generally in the axial direction toward the inboard end 18 and away from outboard end 20, and an outboard direction (Arrow B) which is generally in the axial direction toward the outboard end 20 and away from inboard end 18.

Hub 2 includes a generally cylindrical hub sleeve 22 and an annular wheel flange 24 which is rigidly secured to and extends radially outwardly from hub sleeve 22 (away from axis X). Flange 24 defines a plurality of wheel bolt holes 26 for receiving therein bolts 6 respectively. Flange 24 has inboard and outboard surfaces 25 and 27 which face away from one another and respectively are inboard-facing and outboard-facing surfaces. Each of holes 26 extends from inboard surface 25 to outboard surface 27. In the exemplary embodiment, there are five holes 26 which are equally circumferentially spaced from one another and equidistant from axis X, for receiving the corresponding five bolts 6 therein. Flange 24 may define a plurality of anode receiving holes 31 which may be threaded holes in which anodes 16A and 16B are respectively received and mounted on flange 24 of hub 2. Holes 31 typically extend in the outboard direction from inboard surface 25 and may extend to outboard surface 27. A pair of holes 31 is typically diametrically opposed such that each hole of the pair is directly on the opposite side of axis X from the other and equidistant from axis X. Each of holes 31 is typically substantially identical. Each hole 31 is disposed circumferentially intermediate an adjacent pair of holes 26 and corresponding adjacent pair of bolts 6. Given the use of five holes 26 and five bolts 6, as well as the diametrically opposed configuration of holes 31, each hole 31 may be closer to one of the holes 26 and bolts 6 than the other of the holes 26 and bolts 6 of the adjacent pair between which the given hole 31 is circumferentially disposed.

Hub sleeve 22 has inboard and outboard ends 28 and 30 which serve as the inboard and outboard ends of hub 2. Sleeve 22 has a sleeve inboard section 32 and a sleeve outboard section 34 such that inboard section 32 extends in the inboard direction to inboard end 28, and outboard section 34 extends in the outboard direction from flange 24 to outboard end 30. Sleeve 22 defines a through passage 36 which serves as a spindle receiving passage for receiving a spindle of a wheeled vehicle for rotatably mounting assembly 1 and a rim and tire thereon. Passage 36 extends from inboard end 28 to outer end 30 and is defined by an inner perimeter or surface 38 which is circular as viewed in the axial direction. Inner perimeter or surface 38 includes an outboard bearing seat 40 which is typically cylindrical and extends inwardly from inboard end 28 to a shoulder 46 which extends radially inwardly from the inboard end of seat 40. Perimeter 38 also includes an inboard bearing seat 42 and seal seat 44. Seal seat 44 is typically cylindrical and extends in the outboard direction from adjacent inboard end 28 to a shoulder 48 at the outboard end of seat 44. Inboard bearing seat 42 is typically cylindrical and extends in the outboard direction from adjacent shoulder 48 to a shoulder 50 which extends radially inwardly from the outboard end of seat 42. Shoulder 48 extends radially inwardly from seal seat 44 to inboard bearing seat 42. Seat 40 is configured to receive therein an outboard bearing which id mounted on and circumscribes a spindle when assembly 1 is mounted on said spindle. Similarly, seat 42 is configured to receive therein an inboard bearing which also circumscribes the spindle when mounted thereon. Seat 44 is configured to receive a seal bearing which also circumscribes the spindle when mounted thereon.

Brake rotor 4 includes a hat or hat section 52 and a friction section or disc section 54 which is rigidly secured to and extends radially outwardly from hat 52. Hat 52 includes an annular wheel bolt flange 56 which is typically a circular annular plate which may extend perpendicular to axis X. Hat 52 also includes a circular annular sidewall 58 which extends in the inboard direction from flange 56. Sidewall 58 may extend parallel to axis X. Flange 56 has a circular inner perimeter 60 which is adjacent and spaced radially outwardly from the outer perimeter of sleeve outboard section 34 adjacent the inboard end of section 34 and outboard surface 27 of flange 56. Flange 56 has an outer perimeter 62, and inboard and outboard surfaces 64 and 66 which extend radially outwardly from adjacent inner perimeter 60 to adjacent outer perimeter 62 and which may be perpendicular to axis X. Sidewall 58 has inner and outer perimeters 68 and 70 which are circular and concentric about axis X and which may be cylindrical. Sidewall 58 has inboard and outboard ends 72 and 74 such that inner and outer perimeters 66 and 68 extend from adjacent end 72 to adjacent end 74. Outboard end 74 is rigidly secured to flange 56 adjacent outer perimeter 62 thereof and extends in the inboard direction therefrom to inboard end 72.

Bolt flange 56 defines therein a plurality of bolt holes 65 which are typically threaded and threadingly engage the externally threaded portions of bolts 6 to secure hub 2 to rotor 4. In the sample embodiment, there are five bolt holes 65 which are respectively aligned with holes 26 in flange 24 such that bolts 6 extend through a given pair of aligned holes 26 and 65 such that a threaded section of each bolt or stud 6 extends in the outboard direction beyond outboard surface 66 to provide sufficient space for mounting the rim of a wheel thereon with lug nuts threaded onto bolts 6. Flange 24 may also define a plurality of anode receiving holes 67 which may be threaded holes and which may be aligned with holes 31 respectively. In this case, holes 67 are likewise diametrically opposed and have a similar position with respect to holes 26 and bolts 6 as do holes 31. Where such holes are used, holes 67 may extend in the outward direction from inboard surface 64 and may extend to outboard surface 66.

Disc section 54 has a circular annular configuration with inner and outer perimeters 76 and 78 which are circular and concentric about axis X. Section 54 also has inboard and outboard surfaces 80 and 82 which extend radially outwardly from adjacent inner perimeter 76 to adjacent outer perimeter 78 and which are typically perpendicular to axis X. Surfaces 80 and 82 serve as friction surfaces or braking surfaces which are engaged by brake pads of a brake caliper when assembly 1 is mounted with a brake system including such a caliper. As is well known in the art, disc section 54 may be formed of a single plate which defines the friction surfaces analogous to surfaces 80 and 82. In the sample embodiment, the brake rotor is a vented rotor which includes a circular annular inboard plate or disc 84, a circular annular outboard plate or disc 86 and a plurality of vanes 88 which are rigidly secured to and extend between plates 84 and 86 such that the plates are axially spaced from one another and such that vanes 88 are circumferentially spaced from one another. There are typically multiple vanes which are spaced circumferentially from one another all the way around discs 84 and 86 extending between the inner and outer perimeters 76 and 78. For example, there may be at least 20, 25, 30, 35, or 40 or more vanes. When there are two plates or discs 84 and 86, surfaces 80 and 82 respectively serve as the inboard surface of plate 84 and the outboard surface of plate 86. Plates 84 and 86 respectively include an inboard surface 90 and an outboard surface 92 which face one another and define therebetween an annular circular space 94 in which vanes 88 are disposed. Each adjacent pair of vanes 88 defines therebetween a vent passage 96 such that there are multiple vent passages 96 along the circumference of the discs between inner and outer perimeters 76 and 78. As known in the art, vent passages 96 are provided to facilitate the flow of air therethrough to facilitate dissipation of the heat created in rotor 4 during the braking process.

One or both of the inboard and outboard plates 84 and 86 may define a plurality of anode receiving holes such as holes 95 which are shown formed in inboard plate 84. Holes 95 may be threaded holes and in the sample embodiment extend from outboard surface 80 to outboard surface 92 of plate 84. In the sample embodiment, four holes 95 are shown in FIG. 1 such that one pair of the holes is diametrically opposed on opposite sides of axis X and another pair is likewise diametrically opposed on opposite sides of axis X and such that each pair of diametrically opposed holes is formed at a 90 degree angle with respect to the other pair of diametrically opposed holes as viewed along axis X. Each pair of diametrically opposed holes is preferably equidistant from axis X and typically all of holes 95 are equidistant from axis X.

Sleeve or anode 10 has an inboard end 98, an outboard end 100 and inner and outer perimeters 99 and 101 extending from adjacent end 98 to adjacent end 100. Sleeve 10 includes a wider segment 102 and a narrower segment 104 separated by a shoulder 106. More particularly, the wider section 102 has a greater outer diameter of outer perimeter 101 than does narrower segment 104. Shoulder 106 extends radially inwardly from the inboard end of segment 102 to the outboard end of segment 104 and serves as a stop which may abut the outboard end 30 of hub 2 to limit the depth of insertion of the insertion portion or segment 104 into passage 36 when sleeve 10 is mounted on hub 2. Wider segment 102 includes an internally threaded section 108 of inner perimeter 99 adjacent outboard end 100. When sleeve 10 is mounted on hub 2, the insert segment 104 is inserted into or received within passage 36 adjacent outboard end 30 and adjacent or within bearing seat 40 such that shoulder 106 may engage outboard end 30 of hub 2. Wider segment 102 is external to passage 36 and extends in the outboard direction from the outboard end of passage 36 and outboard end 30.

Dust cap 12 includes a generally cylindrical sidewall 110 which is essentially concentric about axis X, and a flat circular cap wall 112 which is rigidly secured to and extends radially inward from the outboard end of sidewall 110. Sidewall 110 includes an externally threaded segment 114 which threadedly engages threaded segment 108 of sleeve 10 to removably secure dust cap 12 to sleeve 10. Sidewall 110 may include a shoulder 116 which faces in the inboard direction outboard and threaded segment 114 such that shoulder 116 may engage outboard end 100 of sleeve 10 when dust cap 12 is secured to sleeve 10 by the threaded engagement between segments 114 and 108. Dust cap 12 may thus easily be secured to sleeve 10 by threading dust cap 12 onto sleeve 10 and removed therefrom by unthreading the dust cap. An annular seal 118 such as a gasket or a compressible O-ring may be disposed outboard of threaded segment 114 and inboard of shoulder 116 to provide a seal between the outer perimeter of sidewall 110 and the inner perimeter 99 of sleeve 10.

Figure 4:
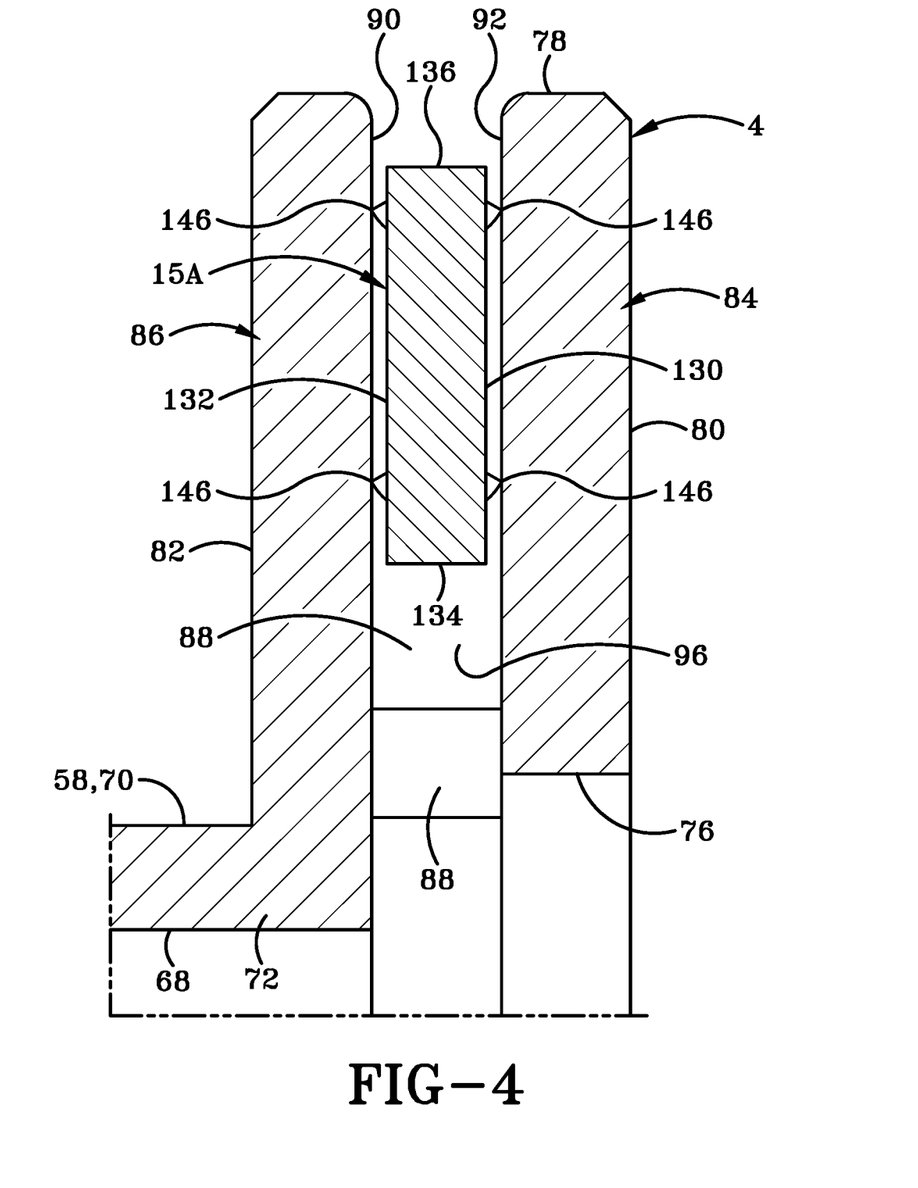
FIG. 4 is a sectional view taken on line 4-4 of FIG. 1.

Each of anodes 14 has an inboard end 120 and an outboard end 122, a first segment 124 which may be a threaded segment, a second segment 126 which may be an unthreaded segment and a tool engaging hole 128 which may for example be a hexagonal hole for receiving therein a hex wrench although various other shapes may be used. In the sample embodiment, segment 124 extends in the outboard direction from adjacent inboard end 120 about halfway to end 122, and segment 126 extends from the outboard end of segment 124 to outboard end 122. First segment 124 is disposed within one of holes 95 while second segment 126 is disposed in or extends within one of passages 96. Inboard end 120 may be flush with or recessed from surface 80, while outboard end 122 may be within the given passage 96 and may abut inboard surface 90. In the sample embodiment, segment 124 may be externally threaded and thereby threadedly engage the internally threaded hole 95 to form a threaded connection which secures anode 14 to plate 84. In the sample embodiment, anode 14 is in direct contact with plate 84 and plate 86, thereby providing direct electrical communication or contact between the given anode 14 and both plates 84 and 86. While the sample embodiment provides a threaded engagement between the given anode 14 and plate 84 within hole 95, anodes 14 may also be press fit into holes 95 and thus secured by a press fit connection without the use of a threaded segment or threaded engagement between the anode and plate. Holes may also be formed in plate 86 which are aligned with holes 95 such that each anode 14 may extend into such holes in plate 86 with or without a threaded connection therein. Inasmuch as anodes 14 are disposed within holes 95, anodes 14 are thus positioned relative to one another in the same manner as holes 95 are positioned relative to one another as described in greater detail further above. Thus, anodes 14A and 14C are a pair of diametrically opposed anodes which are equidistant from axis X. Likewise, anodes 14B and 14D are a pair of diametrically opposed anodes which are equidistant from axis X. Each pair of diametrically opposed anodes 14A and 14C is formed at a 90 degree angle with respect to the other pair of diametrically opposed anodes 14B and 14D as viewed along axis X. Typically, all of anodes 14 are equidistant from axis X. In the sample embodiment, all of anodes 14 have the same dimensions and weight and are essentially identical whereby their positioning ensures that assembly 1 is weight balanced during rotation about axis X.

Figure 5:
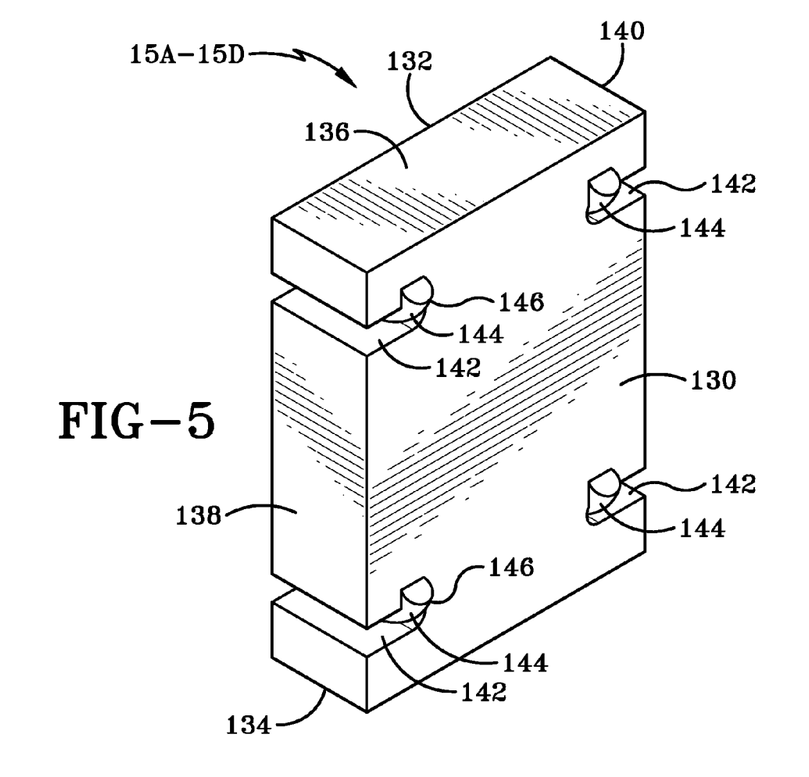
FIG. 5 is a perspective view of one of the sacrificial anodes.
Figure 6:
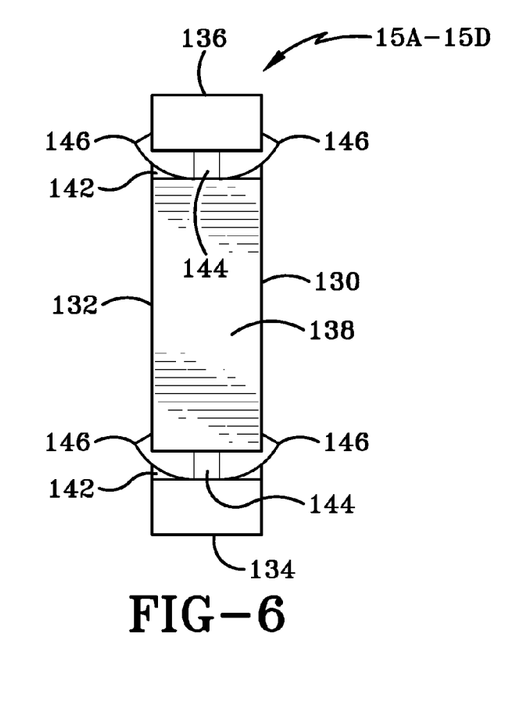
FIG. 6 is an elevation view of the anode of FIG. 5.

Each anode 15 may essentially be a block and have a box shape or parallelepiped configuration. In the sample embodiment, anode 15 has flat inboard and outboard surfaces 130 and 132 which are parallel, radial inner and outer ends or surfaces 134 and 136 which are parallel to one another and perpendicular to surfaces 130 and 132, and circumferential ends or surfaces 138 and 140 which are parallel to one another and perpendicular to surfaces 130 and 32 and ends or surfaces 134 and 136. Anode 15 may define a plurality of slots 142. In the sample embodiment, four slots 142 are formed in anode 15, with two of slots 142 extending inwardly from circumferential end 138 toward end 140, and two of slots 142 extending inwardly from end 140 toward end 138. Thus, two of the slots are open ended at end or surface 138 and the other two slots 142 are open ended at end or surface 140. Each of the slots 142 also extends from inboard surface 130 to outboard surface 132 and thus is open ended at both these surfaces as well. Each slot 142 extends inwardly into anode 15 to a closed end.

A plurality of connectors 144 are secured to anode 15 and extend outwardly therefrom such that portions of connectors 144 extend outwardly in the inboard direction beyond inward surface 130 and other portions of connectors 144 extend in the outboard direction beyond outboard surface 132. In the sample embodiment, connectors 144 are springs formed of spring steel which have opposed ends 146. The body of each spring 144 is received in a given slot 142 such that each spring 144 is secured to anode 15. The inboard end 146 of a given spring 144 extends outwardly out of a given slot 142 beyond inboard surface 130 in the inboard direction, while the outboard end 146 of a given spring extends out of a given slot 142 beyond outboard surface 132 in the outboard direction. Each spring 144 is curved such that ends 146 extend or are angled toward the radial outer end 136 of anode 15.

Anode 15 is secured to brake rotor 4 by inserting the given anode 15 with connectors 144 secured thereto into one of vent passages 96 in a radial inward direction from the outer perimeter 78 toward the inner perimeter 76 and toward axis X. During insertion of anode 15 into the given passage 96, ends 46 slidably engage surfaces 90 and 92 of plates 86 and 84 respectively. Once anode 15 is mounted within passage 96, the inboard ends 146 of springs 144 engage outboard surface 92 and the outboard ends 146 engage inboard surface 90, thus providing a press fit or interference fit between the ends of the springs and surfaces 90 and 92 to secure anode 15 to discs 84 and 86. In this secured position, ends 146 extend or are angled radially outwardly away from axis X and inner perimeter 76 and toward outer perimeter 78. Inboard surface 130 is adjacent and faces outboard surface 92, while outboard surface 132 is adjacent and faces inboard surface 90. Surfaces 130, 132, 90, and 92 may be parallel. Radial inner end or surface 134 faces radially inwardly toward axis X, while radial outer end or surface 136 faces radially outwardly away from axis X. Anode 15 is in electrical communication with plates 84 and 86 via connectors 144. More particularly, each anode 15 is in direct electrical communication or contact with connectors 144, which are in turn in direct electrical communication or contact with plates 84 and 86 via contact between ends 146 and the respective surfaces 90 and 92.

As shown in FIG. 1, anodes 15A-D are arranged in a pattern similar to that of anodes 14A-D. Thus, anodes 15A and 15C are a pair of diametrically opposed anodes which are equidistant from axis X. Likewise, anodes 15B and 15D are a pair of diametrically opposed anodes which are equidistant from axis X. Each pair of diametrically opposed anodes 15A and 15C is formed at a 90 degree angle with respect to the other pair of diametrically opposed anodes 15B and 15D as viewed along axis X. Typically, all of anodes 15 are equidistant from axis X. In the sample embodiment, all of anodes 15 have the same dimensions and weight and are essentially identical whereby their positioning ensures that assembly 1 is weight balanced during rotation about axis X.

Anodes 16 each have an inboard end 148 and an outboard end 150. Each anode 16 includes a first segment 152 which may be a threaded segment, and may also include a second segment 154 (shown in dashed lines in FIG. 3). Segment 152 may define a tool engaging hole 128 such as a hexagonal hole or other shape as discussed previously. Each anode 16 is received within a respective hole 31 and may also extend into a hole 67 aligned with hole 31. In the sample embodiment, anode 16 in solid lines is shown only within hole 31 with outboard surface 150 in contact with inboard surface 64 of flange 56. If segment 152 is threaded, there may be a threaded engagement or connection between the externally threaded segment 152 and internally threaded hole 31 to secure anode 16 to flange 24 of hub 2. In the sample embodiment, anode 16 is thus in direct electrical communication or contact with flange 24 and flange 56.

As with the other anodes, anodes 16A and 16B are typically diametrically opposed and equidistant from axis X, and are essentially identical and have the same weight so that assembly 1 is weight balanced during rotation about axis X. It is noted that anodes such as anodes 14, 15 and 16 may be positioned other than in the diametrically opposed configuration while still maintaining the weight balance of assembly 1. For instance, three anodes which are essentially identical may be circumferentially spaced about axis X (120 degrees apart) such that they are equidistant from axis X and equidistant from one another. Other weight balanced configurations will be understood by one skilled in the art.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration set out herein are an example and the invention is not limited to the exact details shown or described.

The invention claimed is:

1. An apparatus comprising:
at least one of a wheel hub and a brake rotor, wherein the at least one of the wheel hub and the brake rotor has an axis of rotation; and wherein the brake rotor further includes a first disc having a first inboard surface and a first outboard surface and a second disc having a second inboard surface and a second outboard surface; and wherein the first disc is spaced apart from the second disc; and wherein the first outboard surface and the second inboard surface define a space therebetween; and
a first sacrificial anode extending within the space and contacting the second inboard surface and the first disc.

2. The apparatus of claim 1 wherein the brake rotor has first and second vanes which extend between the first and second discs and define therebetween a vent passage; and the first anode extends within the vent passage.

3. The apparatus of claim 1 further comprising a threaded engagement between the first anode and the at least one of the hub and brake rotor.

4. The apparatus of claim 1 further comprising a press fit engagement which secures the first anode to the at least one of the hub and brake rotor.

5. The apparatus of claim 4 wherein a connector extends outwardly from the first anode; and the press fit engagement is between the connector and brake rotor.

6. The apparatus of claim 5 wherein the connector comprises a spring formed of spring metal.

7. The apparatus of claim 1 further comprising a press fit engagement between the first anode and the at least one of the hub and brake rotor.

8. The apparatus of claim 1 wherein the first sacrificial anode extends within the space and contacts the first outboard surface and the second inboard surface.

9. The apparatus of claim 1 wherein the first disc defines a hole; and wherein the first sacrificial anode extends within the space; and wherein a portion of the first sacrificial anode extends within the hole.

10. The apparatus of claim 1 further comprising a second sacrificial anode secured to the at least one of the hub and brake rotor in a position such that the at least one of the hub and brake rotor is essentially weight balanced during rotation of the at least one of the hub and brake rotor about the axis.

11. The apparatus of claim 10 wherein the first and second anodes are diametrically opposed to one another.

12. An apparatus comprising:
at least one of a wheel hub and a brake rotor;
a first sacrificial anode provided on at least one of the wheel hub and the brake rotor; and
a wheel bolt flange, wherein the wheel bolt flange is located on one of the hub and the brake rotor, and wherein the first anode contacts the wheel bolt flange.

13. The apparatus of claim 12 further comprising a second sacrificial anode secured to the at least one of the hub and brake rotor in a position such that the at least one of the hub and brake rotor is essentially weight balanced during rotation of the at least one of the hub and brake rotor about the axis.

14. The apparatus of claim 13, wherein the first and second anodes are diametrically opposed to one another.

15. An apparatus comprising:
at least one of a wheel hub and a brake rotor, wherein the at least one of the hub and brake rotor has an axis of rotation; and
a first sacrificial anode provided on the wheel hub, wherein the first anode comprises a sleeve that extends outwardly from the wheel hub and concentrically about the axis of rotation.

16. The apparatus of claim 15, further comprising:
a second sacrificial anode secured to the at least one of the wheel hub and brake rotor; and
a wheel bolt flange, wherein the wheel bolt flange is located on one of the hub and the brake rotor; and wherein the second anode contacts the wheel bolt flange.

17. The apparatus of claim 16, further comprising a hole formed in the wheel bolt flange; and a portion of the second anode in the hole.

18. The apparatus of claim 16, further comprising:
a third sacrificial anode secured to the at least one of the wheel hub and brake rotor; wherein the third anode contacts the wheel bolt flange; and wherein the second and third anodes are diametrically opposed to one another.

19. The apparatus of claim 15, wherein the wheel hub has an inner perimeter; and the sleeve has an outer perimeter which contacts the inner perimeter.

20. The apparatus of claim 15 further comprising a press fit connection between the inner perimeter of the wheel hub and the outer perimeter of the sleeve.

\* \* \* \* \*